US009973483B2

(12) United States Patent
Allrich et al.

(10) Patent No.: US 9,973,483 B2
(45) Date of Patent: May 15, 2018

(54) ROLE-BASED NOTIFICATION SERVICE

(71) Applicant: Microsoft Technology Licensing, LLC, Redmond, WA (US)

(72) Inventors: Brian Raymond Allrich, Moorhead, MN (US); Michael Steven Hammond, Moorhead, MN (US); Yury Mikheev, Wells Fargo, MN (US); Kevin Martin Racer, Osage, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/986,044

(22) Filed: Dec. 31, 2015

(65) Prior Publication Data

US 2017/0085541 A1 Mar. 23, 2017

Related U.S. Application Data

(60) Provisional application No. 62/222,142, filed on Sep. 22, 2015.

(51) Int. Cl.

| | |
|---|---|
| ***G06F 7/04*** | (2006.01) |
| ***H04L 29/06*** | (2006.01) |
| ***H04L 12/58*** | (2006.01) |
| ***H04L 29/08*** | (2006.01) |
| ***G06Q 10/06*** | (2012.01) |

(52) U.S. Cl.

CPC ........... *H04L 63/061* (2013.01); *G06Q 10/06* (2013.01); *H04L 51/24* (2013.01); *H04L 63/102* (2013.01); *H04L 67/10* (2013.01)

(58) Field of Classification Search

CPC ..... H04L 63/061; H04L 63/102; H04L 67/10; H04L 51/24

USPC ............................................. 726/1–5, 26–30

See application file for complete search history.

(56) References Cited

U.S. PATENT DOCUMENTS

| | | | | |
|---|---|---|---|---|
| 6,092,102 | A | 7/2000 | Wagner | |
| 6,751,657 | B1 | 6/2004 | Zothner | |
| 7,305,392 | B1 | 12/2007 | Abrams et al. | |
| 7,409,463 | B2 | 8/2008 | Ramachandran | |
| 7,953,846 | B1 * | 5/2011 | Amoroso ................ | G06F 21/57 709/219 |
| 7,962,426 | B2 | 6/2011 | Pall et al. | |

(Continued)

OTHER PUBLICATIONS

Coutinho et al., "A role-based routing solution for MANET to support hierarchical rescue teams in emergency scenarios," 2015 International Conference on Information Networking (ICOIN) Year: 2015 pp. 13-18.*

(Continued)

*Primary Examiner* — Roderick Tolentino

(74) *Attorney, Agent, or Firm* — Harness, Dickey & Pierce, P.L.C.

(57) ABSTRACT

A notification system automatically sends notifications to users based on the defined roles of the notifications. The notification system allows an application to define in a secure manner users to roles. The notification system also allows the users to register in a secure manner their devices with the notification system. The notification system allows the application to then send a notification to users with a target role. Upon receiving the notification, the notification system identifies the devices of the users with the target role and sends the notification to those devices.

14 Claims, 8 Drawing Sheets

(56) References Cited

U.S. PATENT DOCUMENTS

| | | | | |
|---|---|---|---|---|
| 8,495,377 | B2 * | 7/2013 | Haddad | H04L 63/0823 380/278 |
| 8,630,624 | B2 * | 1/2014 | Marcellino | H04L 51/24 455/3.01 |
| 8,914,842 | B2 | 12/2014 | Mani et al. | |
| 8,965,987 | B2 | 2/2015 | Lehmann et al. | |
| 9,054,919 | B2 | 6/2015 | Kiang et al. | |
| 2002/0144142 | A1 | 10/2002 | Shohat | |
| 2006/0193473 | A1 * | 8/2006 | Fu | H04L 9/0822 380/277 |
| 2007/0214497 | A1 | 9/2007 | Montgomery et al. | |
| 2009/0128319 | A1 | 5/2009 | Dholakia et al. | |
| 2009/0249290 | A1 * | 10/2009 | Jenkins | G06F 9/4443 717/109 |
| 2013/0067365 | A1 | 3/2013 | Shrufi et al. | |
| 2013/0103639 | A1 | 4/2013 | Greenberg et al. | |
| 2013/0117290 | A1 * | 5/2013 | Park | G06F 8/31 707/756 |
| 2013/0191878 | A1 | 7/2013 | Mani et al. | |
| 2013/0211546 | A1 | 8/2013 | Lawson et al. | |
| 2013/0211559 | A1 | 8/2013 | Lawson et al. | |
| 2014/0047064 | A1 | 2/2014 | Maturana et al. | |
| 2014/0074999 | A1 | 3/2014 | Khalsa et al. | |
| 2014/0156547 | A1 * | 6/2014 | Winston | G06Q 10/10 705/317 |
| 2014/0258711 | A1 | 9/2014 | Brannon | |
| 2014/0365431 | A1 * | 12/2014 | Kapoor | G09B 7/00 707/609 |
| 2015/0358331 | A1 * | 12/2015 | Rachalwar | H04L 63/105 726/7 |
| 2016/0330712 | A1 * | 11/2016 | Bleakley | H04W 4/06 |

OTHER PUBLICATIONS

Ahmed et al., "Semantic modeling of analytic-based relationships with Direct Qualification," Proceedings of the 2015 IEEE 9th International Conference on Semantic Computing (IEEE ICSC 2015) Year: 2015 pp. 432-435.*

Thexton, et al., "A Role-Based Approach to Automated Provisioning and Personalized Portals," Published on: Jan. 2011 Available at: http://www.oracle.com/technetwork/articles/role-based-automated-provisioning-213244.html.

"Oracle User Management Setup and Administration," Published on: Feb. 12, 2012 Available at: https://docs.oracle.com/cd/E18727_01/doc.121/e12843/T156458T156460.htm.

"Registration Management," Retrieved on: Oct. 20, 2015 Available at: https://msdn.microsoft.com/en-us/library/azure/dn530747.aspx.

"Registering from your App Backend," Retrieved on: Oct. 20, 2015 Available at: https://msdn.microsoft.com/library/azure/dn743807.aspx.

"Security," Retrieved on: Oct. 20, 2015 Available at: https://msdn.microsoft.com/en-us/library/azure/dn495373.aspx.

Gailey, Glenn, "Send push notifications to authenticated users," Retrieved on: Oct. 20, 2015 Available at: https://azure.microsoft.com/en-us/documentation/articles/mobile-services-dotnet-backend-windows-store-dotnet-push-notifications-app-users/.

"Notification Hubs," Retrieved on: Oct. 20, 2015 Available at: https://azure.microsoft.com/en-us/services/notification-hubs/.

"Routing and Tag Expressions," Retrieved on: Oct. 20, 2015 Available at: https://msdn.microsoft.com/library/azure/dn530749.aspx.

McSwain, Wesley, "Use Notification Hubs to send breaking news," Retrieved on: Oct. 20, 2015 Available at: https://azure.microsoft.com/en-us/documentation/articles/notification-hubs-ios-send-breaking-news/.

"International Search Report and Written Opinion Issued in PCT Application No. PCT/US2016/051801," dated Oct. 27, 2016, 12 Pages.

"Second Written Opinion Issued in PCT Application No. PCT/US2016/051801", dated Aug. 17, 2017, 8 Pages.

Intemational Preliminary Report on Patentability regarding PCT/US2016/051801, dated Dec. 1, 2017.

"vFabric Hyperic Administration, Configure Roles for Role-Based Alert Notifications," VMware, Inc., 2012, relevant page at p. 31.

"MIR3 sends secure, role-based notification," retrieved from http://www.zdnet.com/article/mir3-sends-secure-role-based-notification/, ZDNet, dated Sep. 22, 2004.

"VMware Introduces vFabric 5," C. McKenzie, TheServerSide.com, Jun. 14, 2011, retrieved from http://www.theserverside.com/news/2240036874/VMware-Introduces-vFabric-5 <https://protect-us.mimecast.com/s/qU39CmZ2O8iD4MBTMdRzd>.

"Role Based Access Controls (RBAC) Permissions," Citrix Product Documentation retrieved from https://docs.citrix.com/en-us/device-manager/xmob-dm-intro-wrapper-con-85/xmob-manage-server-admin-wrapper-con/xmob-dm-manage-customroles-con.html, Jun. 23, 2013.

"Solutions," Bridgestream Inc., retrieved from http://www.networkworld.com/article/2313701/access-control/bridgestream-separates-business-roles-from-it-roles.html, Jan. 12, 2005.

"Bridgestream Separates Business Roles From IT Roles," D. Keams, Network World, Aug. 29, 2005.

"Oracle Buys Enterprise Role Management Leader Bridgestream," Oracle Presentation retrieved from http://www.oracle.com/us/corporate/Acquisitions/bridgestream/general-presentation-072380.pdf, Sep. 5, 2007.

* cited by examiner

ROLE-BASED NOTIFICATION SERVICE

This application claims the benefit of U.S. Provisional Patent Application No. 62/222,142, filed on Sep. 22, 2015, which is incorporated herein by reference.

BACKGROUND

Organizations generate vast amounts of data. The data may include, for example, raw data of a business such as sales data, click through data, marketing data, customer data, and electronic mail messages, and raw data of a governmental entity such as samplings from road sensors, traffic cameras, weather forecasts, event schedules, construction schedules, and passenger manifests. In addition, the data may include analytics data generated by various analytics tools from the raw data.

An increasing number of users need access to such data of an organization. It can be difficult, however, for the users to cull through the vast amounts of data to find the data that is of interest to them. In addition, the time it takes for users to cull through the data may mean that the users may not find the data soon enough to take effective action. For example, an analytics tool may predict a drop in revenue for a business, but the executives of the organization may not find out about the predicted drop in revenue until it is too late to redirect marketing efforts to mitigate the drop. As another example, an analytics tool may predict traffic congestion resulting from a planned construction project, but users in a transportation department may not find out about the predicted traffic congestion soon enough to take steps to avoid the congestion. To find out about such data, users typically either log into their system to search for the data they are looking for by running a report or receive an email sent by their system that may contain a report. Both ways of finding out about such data present challenges for the user. The first requires the user to have access to and repeatedly log into the system. The second requires the user to review what may be massive amounts of emails received in a day or to define rules to be applied to incoming emails, which may result in emails of interest being missed or going unnoticed for a few days.

Some systems allow users to sign up to receive notifications of certain events. For example, an article publication service may allow a user to specify queries or other criteria that define article that may be of interest to the user. When the article publication service receives a new article, it identifies which queries the new article matches and sends a notification to the user (e.g., via text message or message to an application of the article publication service executing on the user's smartphone). The user can then select to review that new article. In general, any user can sign up to receive any of the articles. A difficulty with such notifications is that a user needs to affirmatively specify each query, and a query may not define all the articles that may be of interest to a user. Another difficulty is that any article that is published via the article publication service is available to all users. For example, an article intended to be viewed only by users with a certain political philosophy will be available to anyone regardless of his or her political philosophy.

SUMMARY

In some embodiments, a notification system automatically sends notifications to users based on the defined roles of the notifications. The notification system allows an application to define in a secure manner the roles and the users as well as a mapping of users to roles. The notification system allows the users to register in a secure manner their devices with the notification system. The notification system allows the application to then send a notification to users with a target role. Upon receiving the notification, the notification system identifies the devices of the users with the target role and sends the notifications to those devices. The notification system may include a role-based notification service ("RNS") and a device-based notification service ("DNS").

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
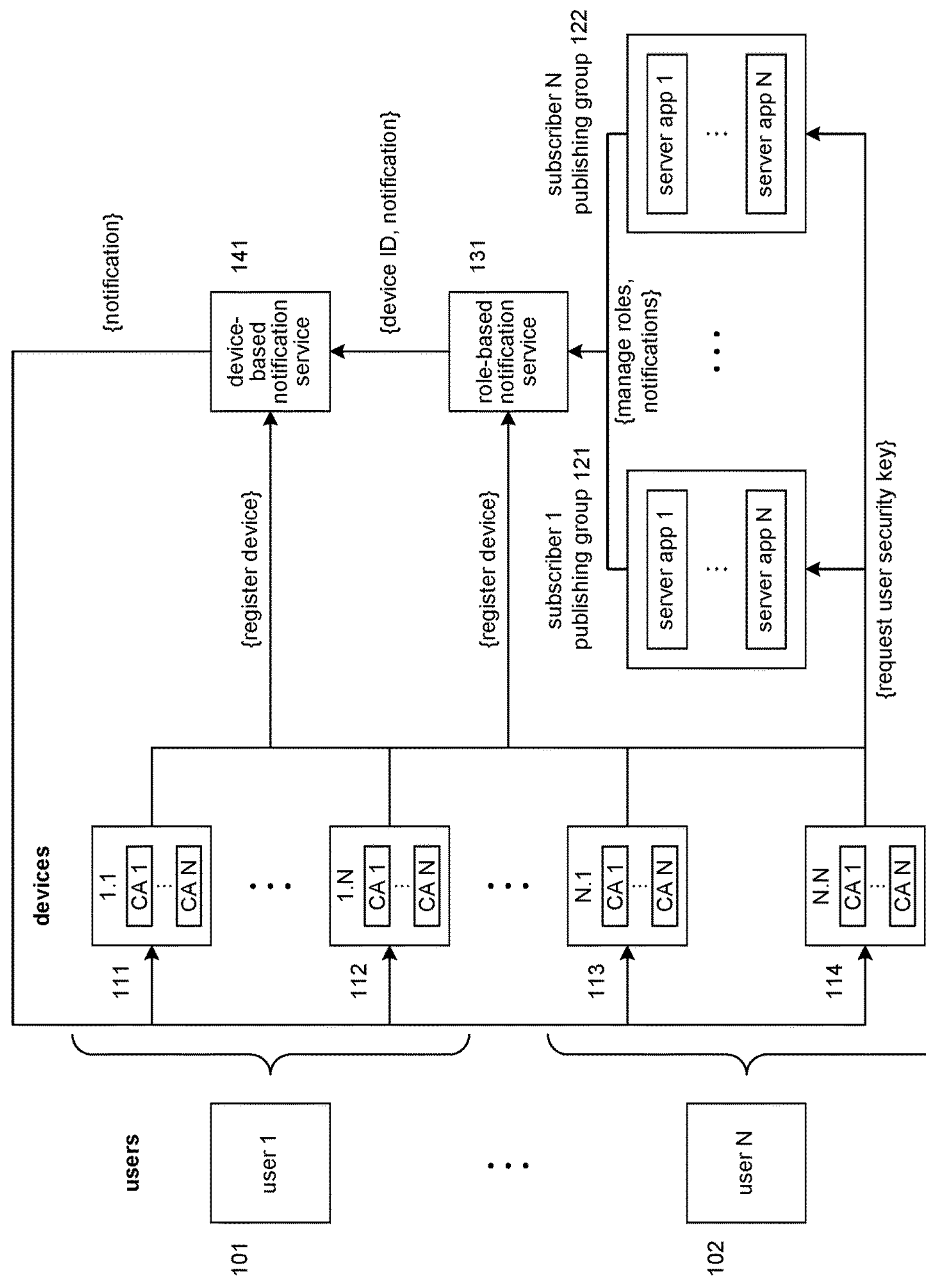
FIG. 1 is a block diagram that illustrates components of a role-based notification architecture in some embodiments.

In some embodiments, a notification system automatically sends notifications to users based on roles of the users and target roles of the notifications. For example, a company may need to send a notification relating to a predicted decline in revenue to a certain group of users, such as the executives of the company. The notification system allows the company to define the roles and the users in each role in a secure manner. For example, an application of the company that is authorized to access the notification system may provide to the notification system, via a secure channel, mappings of users to roles. The notification system also allows the users to register their devices (e.g., smartphones and tablets) in a secure manner with the notification system. For example, the application may provide to authorized users security information for use in securely registering their devices with the notification system. The notification system allows the company to then send a notification to users with a target role. For example, when the application predicts a decline in revenue, the application may immediately send to the notification system a notification of the predicted decline to be sent to users with the target role of executive. Upon receiving the notification, the notification system identifies the devices of the users with the target role and sends the notifications to those devices. In this way, the company can ensure that notifications are sent only to the intended users and that the notifications are sent and received in a timely manner.

In some embodiments, the notification system includes a role-based notification service ("RNS") and a device-based notification service ("DNS"). The RNS provides role-based functionality of the notification system and the DNS provides device-based functionality. The role-based functionality supports the defining of mappings of users to roles, the registering of devices to users, and the sending of notifications to users with a target role. The RNS may provide an application programming interface ("API") through which an application of an organization can define the mappings of users to roles and send the notifications. The RNS may also provide an interface through which users can register their devices. Upon receiving a notification to be sent to a target role, the RNS uses the mappings of users to the target role and registrations of devices to users to identify the devices that are to receive the notification. The RNS then provides the identification of the devices and the notification to the DNS. The DNS then sends the notification to each of the devices. The DNS may be an existing notification service such as the Azure Notification Hub of Microsoft Corporation. The DNS may interface with platform-specific notification systems such as the Windows Notification Service or Apple Push Notification Service to send the notifications to various types of devices such as a Windows Phone or an iPhone.

In some embodiments, the RNS sends role-based notifications to devices of users via the DNS. The RNS receives from an application a request to register users of the application with particular roles. For example, the application may be a sales prediction tool of an organization that is hosted by servers in a cloud-based data center, and the roles may include executive, sales, human resources, engineer, and so on. The RNS maps the users to their roles. For example, Jeff and Chad may be mapped to the role of executive and Pam may be mapped to the role of engineer. The RNS then receives from the devices of users requests to register the devices for receiving role-based notifications. For example, the RNS may receive from Jeff's Surface Pro 3 a request to register that device, from Jeff's Windows 10 mobile a request to register that device, from Chad's iPhone a request to register that device, and from Pam's Android phone a request to register that device. Jeff may also have an iPad but decide not to register that device. The RNS then maps the devices to the corresponding users. After the registration, the RNS may receive from the application a request to send a notification to devices of users with a target role. For example, the application may request to send to users with the target role of executive a notification that a 10% decline in revenue is projected. The RNS then identifies the devices of users with the target role based on the mapping of users to the target role and the mapping of devices to those users. For example, the RNS would identify that Jeff and Chad are mapped to the role of executive and identify that Jeff's Surface Pro 3 and Windows 10 mobile are registered to Jeff and that Chad's iPhone is registered to Chad. The RNS, however, would not identify Pam's Android phone since Pam is not an executive and would not identify Jeff's iPad since Jeff did not register the iPad with the RNS. The RNS then requests the DNS service to send the notification to the identified devices. For example, the RNS would provide the notification and the device identifiers of Jeff's Surface Pro 3 and Windows 10 mobile and Chad's iPhone to the DNS, which would forward the notification to these identified devices. When a device receives a notification, the device can immediately provide the notification to the user. For example, the device may display a toast or a dialog box with a sound to notify the user. In some embodiments, the RNS may interface with various applications to provide role-based notifications on behalf of the applications without each application having to implement an application-specific role-based notification service. The RNS thus provides an effective mechanism for various applications to notify users of data of interest in a timely manner.

In some embodiments, an application interfacing with the RNS registers users to receive role-based notifications via the DNS. The application may be a server application. Initially, the application may provide to a device of a user context information for use in registering the user with the RNS. For example, the application may send to Jeff's Surface Pro 3 an email with the context information that includes a web link for providing secure access to register the Surface Pro 3 as one of Jeff's devices. The application then receives from the device a request to register the user. For example, when Jeff selects the web link, a client application executing on the Surface Pro 3 may coordinate the authenticating of Jeff to the application and the sending of the request to register the user. After receiving the request, the application requests and receives from the RNS a user security key for the user. The user security key may be a private key of a public/private key pair generated by the RNS. The application then sends to the device the user security key for registering the device with the RNS as a device of the user.

In some embodiments, a user registers a device with the RNS to receive role-based notifications. The device receives from a server application context information for registering the user of the device to receive role-based notifications. Via a client application executing on the device, the device uses the context information to send to the server application authentication information to authenticate the user along with a request to register the user to receive role-based notifications generated by the server application. The device then receives from the server application a user security key and an identifier of the RNS (e.g., an endpoint address). The device then sends to the RNS a request to register the device to the user. The request to register the device may include the user security key. The RNS then registers the device to the user, and the user may have already been mapped to a role.

In some embodiments, an application sends role-based notifications to users via the DNS. The application registers with the RNS mappings of users to roles. For example, the application registers that Jeff is mapped to the role of executive. The application then sends to a device of a user a user security key for registering the device with the RNS. For example, Jeff registers his Surface Pro 3 with the RNS using the user security key. The application then generates a notification to send to users with a target role. For example, the application generates a notification that the revenue will decline by 10% to be sent to the executives. The application then sends a request to the RNS to send the generated notification via the DNS to users with the target role.

FIG. 1 is a block diagram that illustrates components of a role-based notification architecture in some embodiments. The components include client applications of user devices 111-114, server applications of subscriber publishing groups 121-122, an RNS 131, and a DNS 141. Each of the users 101 and 102 may have multiple devices. For example, user 101 may have devices 111-112, and user 102 may have devices 113-114. Each device may have installed one or more client applications ("CA") that interface with different server applications of different subscribers to the RNS. For example, each company and each governmental entity may be a separate subscriber to the RNS. The server applications of the subscribers, the RNS, and the DNS may be hosted on servers of a data center. The applications of a subscriber may be organized into one or more subscriber publishing groups 121-122. Each subscriber publishing group of a subscriber may contain multiple server applications of that subscriber. For example, a business subscriber may specify that one of its subscriber publishing groups includes a customer relationship management ("CRM") system, an enterprise resource planning ("ERP") system, and a human resource ("HR") system and that another of its subscriber publishing groups includes an accounting system, a payroll system, and a benefits system. A subscriber uses a management portal of the RNS to define the subscriber publishing groups and the server applications within each group. The RNS may provide each server application with a unique application key that identifies that application and a private application key that is a private key of a public/private key pair generated for the application. Alternatively, the RNS may provide an application key to be shared by the server applications within a subscriber publishing group in addition to a private application key for each application. A server application uses its private application key for authentication with the RNS. This authentication ensures that each server application can securely register with the RNS its mappings of users to roles. The devices and the server applications interface with the RNS 131. The devices and the RNS interface with the DNS 141. The arrows on the lines between the components of FIG. 1 indicate the direction of initiating communications. For example, the lines between the subscriber publishing groups 121-122 and the RNS 131 indicate that the server applications initiate the management of roles with the RNS and the sending of notifications. As another example, the line between the RNS 131 and the DNS 141 indicates that the RNS initiates the sending of notifications along with the device identifiers of the devices to which the notifications are to be sent.

The subscriber publishing groups may allow the applications of a group to share the mappings of users to roles. For example, a CRM application of a subscriber publishing group may register with the RNS a mapping of users to the executive role. When registering that mapping, the CRM application uses its private application key to authenticate that it has permission to register mappings for the CRM application. When the CRM application sends to the RNS a notification to be sent to users of the executive role, the CRM provides its private application key for authentication purposes. Normally, another application of the subscriber, such as an ERP application, would need to register its own mapping of users to the executive role using its own private application key. However, if the subscriber shares the private application key of the CRM application with the ERP application, the ERP application could use that shared private application key to send notifications to the users of the executive role that were registered by the CRM application. Thus, the applications in a subscriber publishing group can share the mappings of users to roles. In addition, a distinguished application of a subscriber publishing group could be designated as being responsible for registering all the mappings of users to roles and then share its private key with all the other applications in the subscriber publishing group so the other applications can share the mappings.

The components of the role-based notification architecture may execute on computing systems that may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The server applications, the RNS, and the DNS may execute on servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the client applications, server applications, the RNS, and the DNS. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys, and for encrypting and decrypting data using the keys.

The role-based notification architecture may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the role-based notification architecture may be implemented in hardware using, for example, an application-specific integrated circuit ("ASIC").

Figure 2:
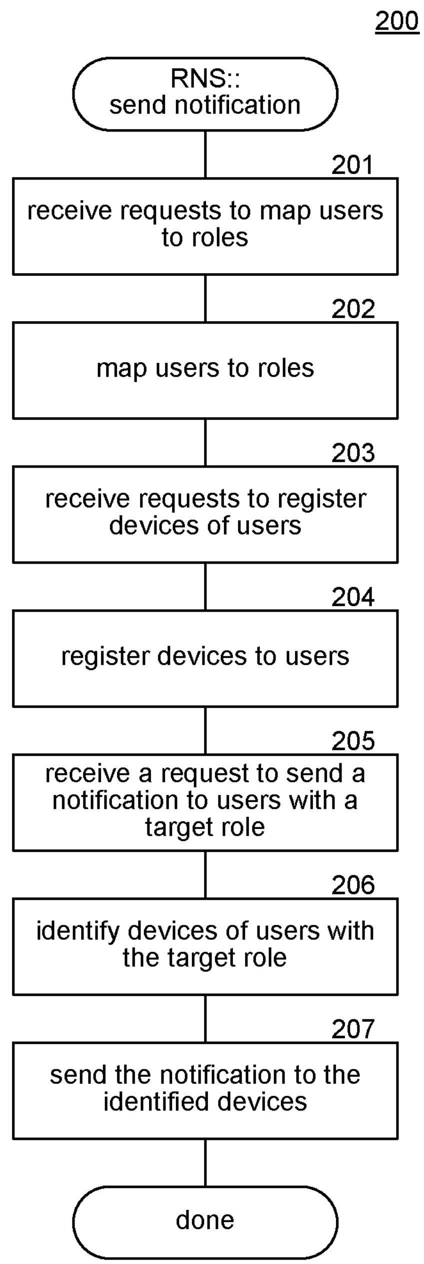
FIG. 2 is a flow diagram that illustrates the processing of a send notification component of an RNS in some embodiments.

FIG. 2 is a flow diagram that illustrates the processing of a send notification component of an RNS in some embodiments. A send notification component 200 illustrates the overall processing of mapping users to roles and devices to users, and sending notifications to devices of users with a target role. In block 201, the component receives a request from an application to map users to roles. Prior to receiving the request, the component may receive from the application a request to register users and a request to register roles. In block 202, the component stores the mappings of the users to the roles. For example, the component stores an indication that Jeff is mapped to the role of executive. In block 203, the component receives from devices of users requests to register the devices to users. For example, the component may receive from Jeff's Surface Pro 3 a request to register that device to Jeff. In block 204, the component stores an indication that the devices are registered to the users as requested. For example, the component may store a unique identifier of Jeff's Surface Pro 3 in association with Jeff's user identifier. In block 205, the component receives from an application a request to send a notification to users with a target role. For example, a revenue forecast application may send to the RNS a request to send to the executives of an organization a notification that the revenue will decline by 10%. In block 206, the component identifies the devices of the users with the target role. For example, the component may identify that Jeff is an executive and Jeff has registered a Surface Pro 3 and a Windows 10 mobile. In block 207, the component sends the notification with the identifiers of the identified devices to the DNS and then completes. In some embodiments, if the DNS functionality is integrated with the RNS, the RNS sends the notifications to the device directly or through one of the platform-specific notification services.

Figure 3:
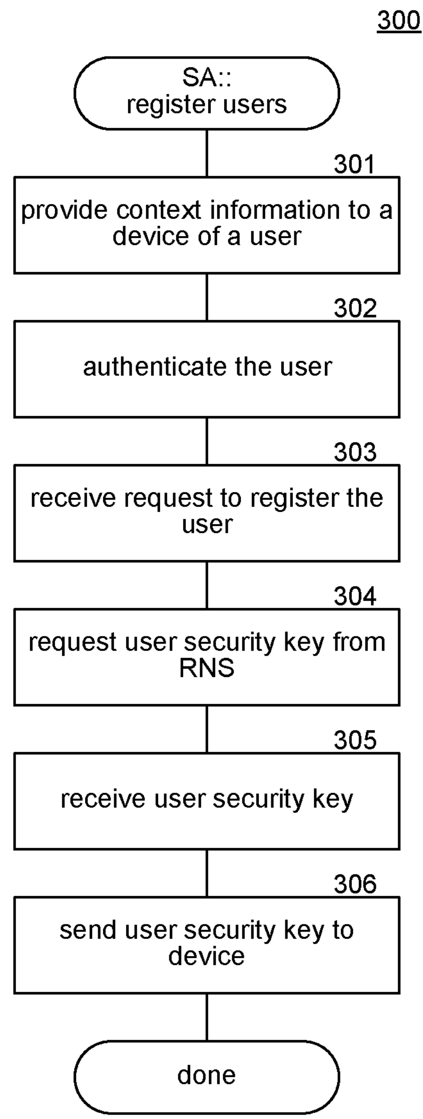
FIG. 3 is a flow diagram that illustrates the processing of a register user component of a server application in some embodiments.

FIG. 3 is a flow diagram that illustrates the processing of a register user component of a server application in some embodiments. A register user component 300 is part of the server application that coordinates the registering of users with the server application. In block 301, the component provides context information to a device of a user who is authorized to use the RNS. For example, the context information may be provided via an email or a text message sent to a device of a user. In block 302, the component authenticates the user. For example, the user may provide the user's password for accessing the server application or the context information may have included authentication information (e.g., a one-time authentication key). In block 303, the component receives from the device of the user a request to register the user. In block 304, the component requests from the RNS a user security key, which may expire after a short time period, for use in authenticating the user to the RNS. In block 305, the component receives the user security key from the RNS. In block 306, the component sends the user security key to the device and then completes.

Figure 4:
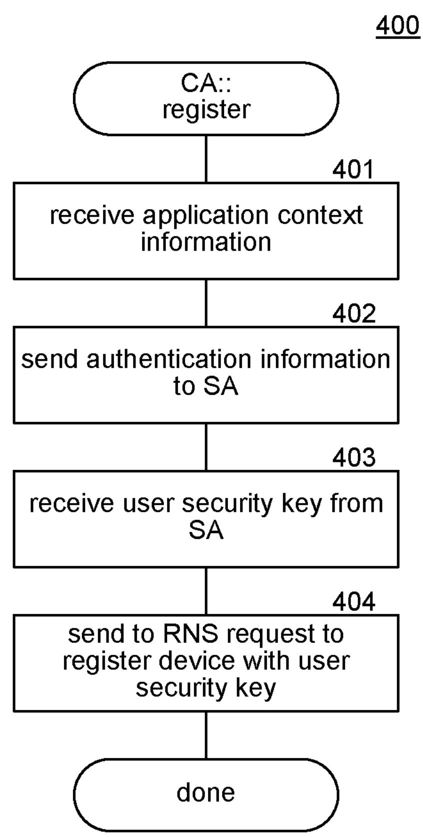
FIG. 4 is a flow diagram that illustrates the processing of a register component of a client application that executes on a device in some embodiments.

FIG. 4 is a flow diagram that illustrates the processing of a register component of a client application that executes on a device in some embodiments. A register component 400 coordinates the registering of the device to receive notifications from a server application. In block 401, the component receives context information from the server application. In block 402, the component sends to the server application authentication information to authenticate the user along with a request to register the user. In block 403, the component receives from the server application a user security key. In block 404, the component sends to the RNS a request to register the device along with the user security key. In some embodiments, if the RNS is not integrated with the functionality of the DNS, the device registers with the DNS. The component then completes.

Figure 5:
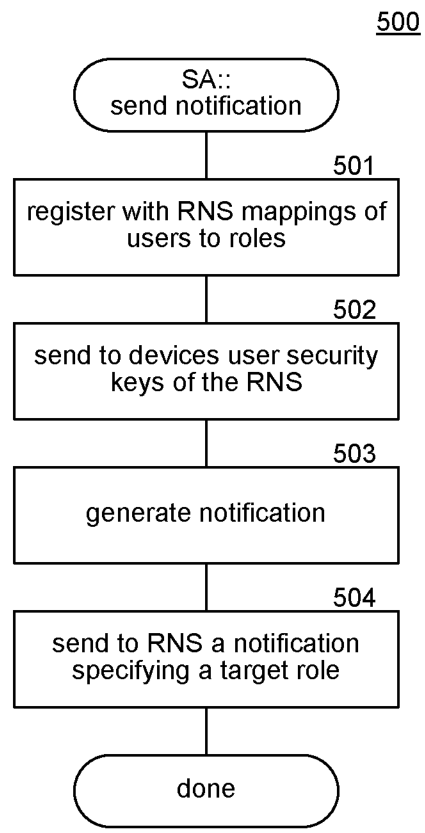
FIG. 5 is a flow diagram that illustrates high-level processing of a send notification component of a server application in some embodiments.

FIG. 5 is a flow diagram that illustrates high-level processing of a send notification component of a server application in some embodiments. A send notification component 500 registers mappings of users to roles with the RNS and sends a notification to the RNS. In block 501, the component registers with the RNS mappings of users to roles. In block 502, the component sends to a device of a user a user security key of the RNS. In block 503, the component generates a notification for users with a target role. In block 504, the component sends the notification along with the target role to the RNS and then completes.

Figure 6:
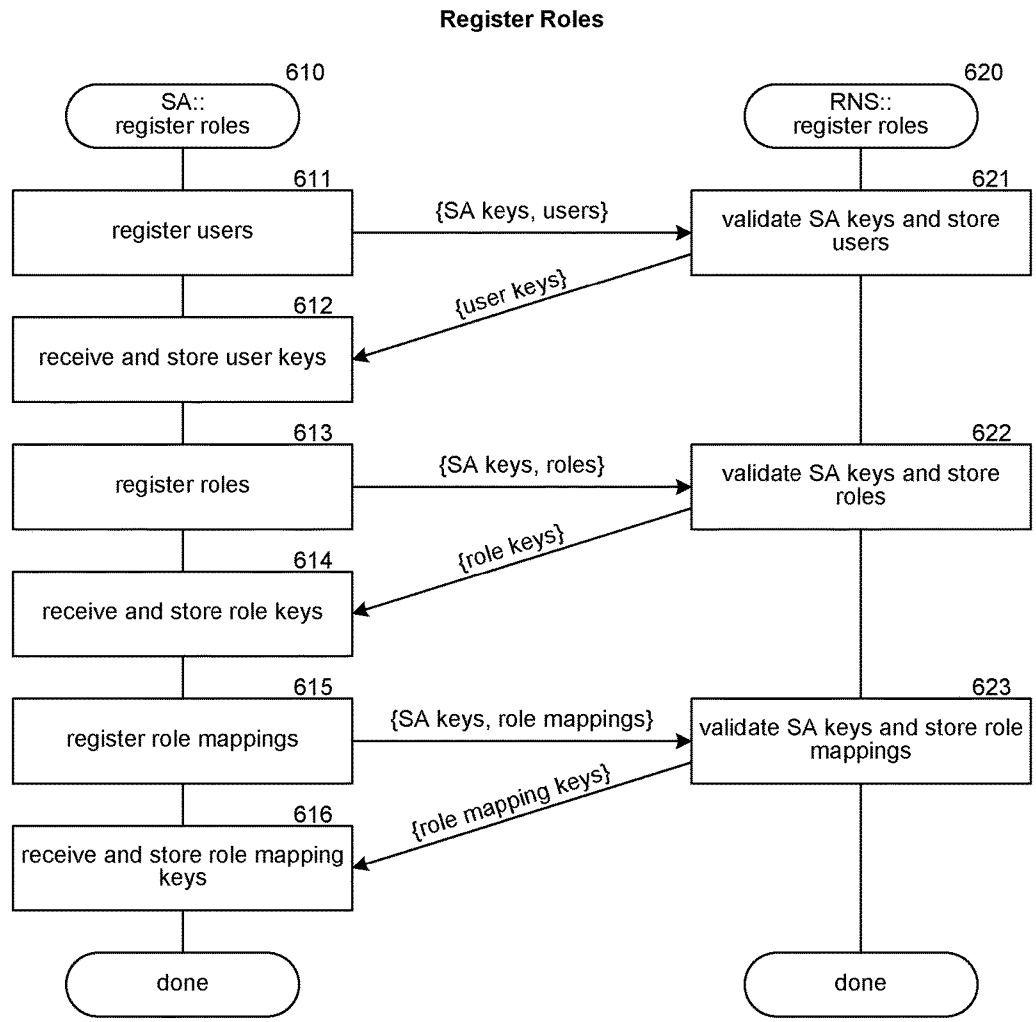
FIG. 6 depicts flow diagrams that illustrate the processing of components of a server application and an RNS that interact to register roles in some embodiments.

FIG. 6 depicts flow diagrams that illustrate the processing of components of a server application and an RNS that interact to register roles in some embodiments. The flow diagram 610 illustrates the processing of a register roles component of a server application and the flow diagram 620 illustrates the processing of a register roles component of the RNS. In block 611, the server application sends a message to the RNS to register users. The message may include the names of the users and application keys, which may include an application key and a private application key. In block 621, the RNS validates the server application keys, stores an indication of the users, and sends user keys to the server application that uniquely identify each user. In block 612, the server application receives and stores the user keys. In block 613, the server application sends a message to the RNS to register roles. The message may include the names of the roles and the server application keys. In block 622, the RNS validates the server application keys, stores the roles, and sends role keys to the server application that uniquely identify each role. In block 614, the server application receives and stores the role keys. In block 615, the server application sends a message to the RNS to register mappings of users to roles. The users and roles may be identified by the user keys and role keys. In some embodiments, the RNS may support sub-roles of a role. For example, the executive role may include a sub-role of board of directors. The role of board of directors may be defined to include each member of the board of directors. The executive role may also be defined to include other individual users (such as a chief technology officer or chief human resources officer) who are not members of the board of directors. A role may contain any number of sub-roles and users, and each sub-role may also contain any number of sub-roles and users. In block 623, the RNS validates the server application keys, stores the mappings of users to roles, and sends role mapping keys to the server application, and then it completes. Each role mapping key may represent a mapping of a sub-role or a user to a role. In block 616, the server application receives and stores the role mapping keys and then completes. The server application may use a role mapping key to, for example, request the RNS to remove the mapping of a user to a role. In some embodiments, the user keys, the role keys, and the role mapping keys may alternatively be generated by a server application and provided to the RNS.

Figure 7:
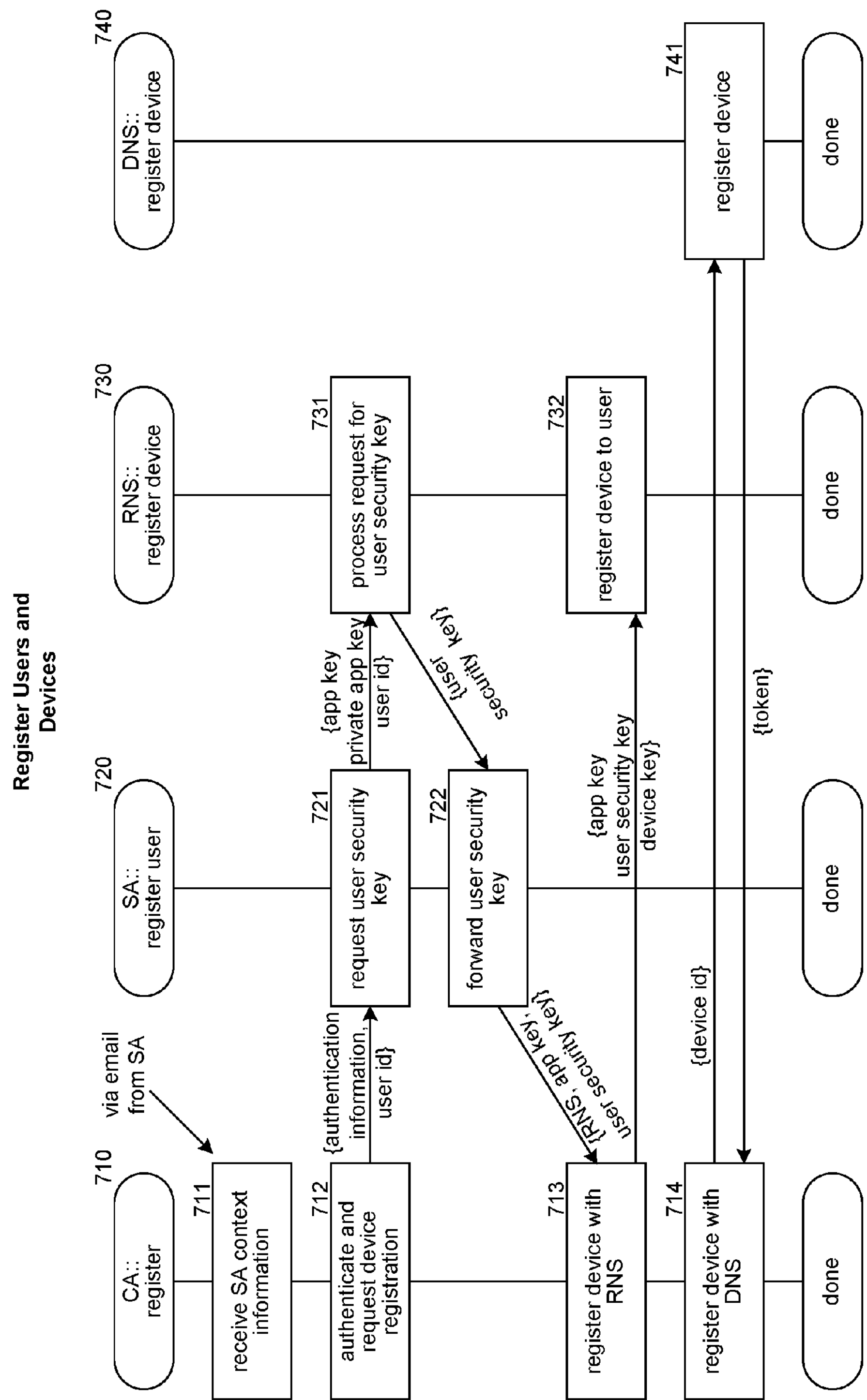
FIG. 7 depicts flow diagrams that illustrate the processing of components of a client application, a server application, an RNS, and a DNS to register devices in some embodiments.

FIG. 7 depicts flow diagrams that illustrate the processing of components of a client application, a server application, an RNS, and a DNS to register devices in some embodiments. The flow diagram 710 illustrates the processing of a register component of the client application, the flow diagram 720 illustrates the processing of a register users component of the server application, the flow diagram 730 illustrates the processing of a register devices component of the RNS, and the flow diagram 740 illustrates the processing of a register devices component of the DNS. In block 711, the client application receives context information from the server application. In block 712, the client application sends to the server application authentication information and a request to register the user. In block 721, the server application authenticates the user and sends to the RNS a request for a user security key for the user. The request for the security key may include an application key and a private application key to authenticate the server application to the RNS. In block 731, the RNS processes the request for the user security key and sends the user security key to the server application. The RNS may generate a public/private key pair and send the private key as the user security key. In block 722, the server application receives the user security key and forwards it to the client application along with an identification of an endpoint for communicating with the RNS and the application key of the server application. The server application then completes. In block 713, the client application receives the user security key and registers the device with the RNS. In block 732, the RNS registers the device to the user and then completes. In block 714, the client application registers the device with the DNS. In block 741, the DNS registers the device and sends a token to the device for use when the device communicates with the DNS. The token may have an expiration period and may need to be renewed periodically. The DNS then completes. The client application receives the token and then completes.

Figure 8:
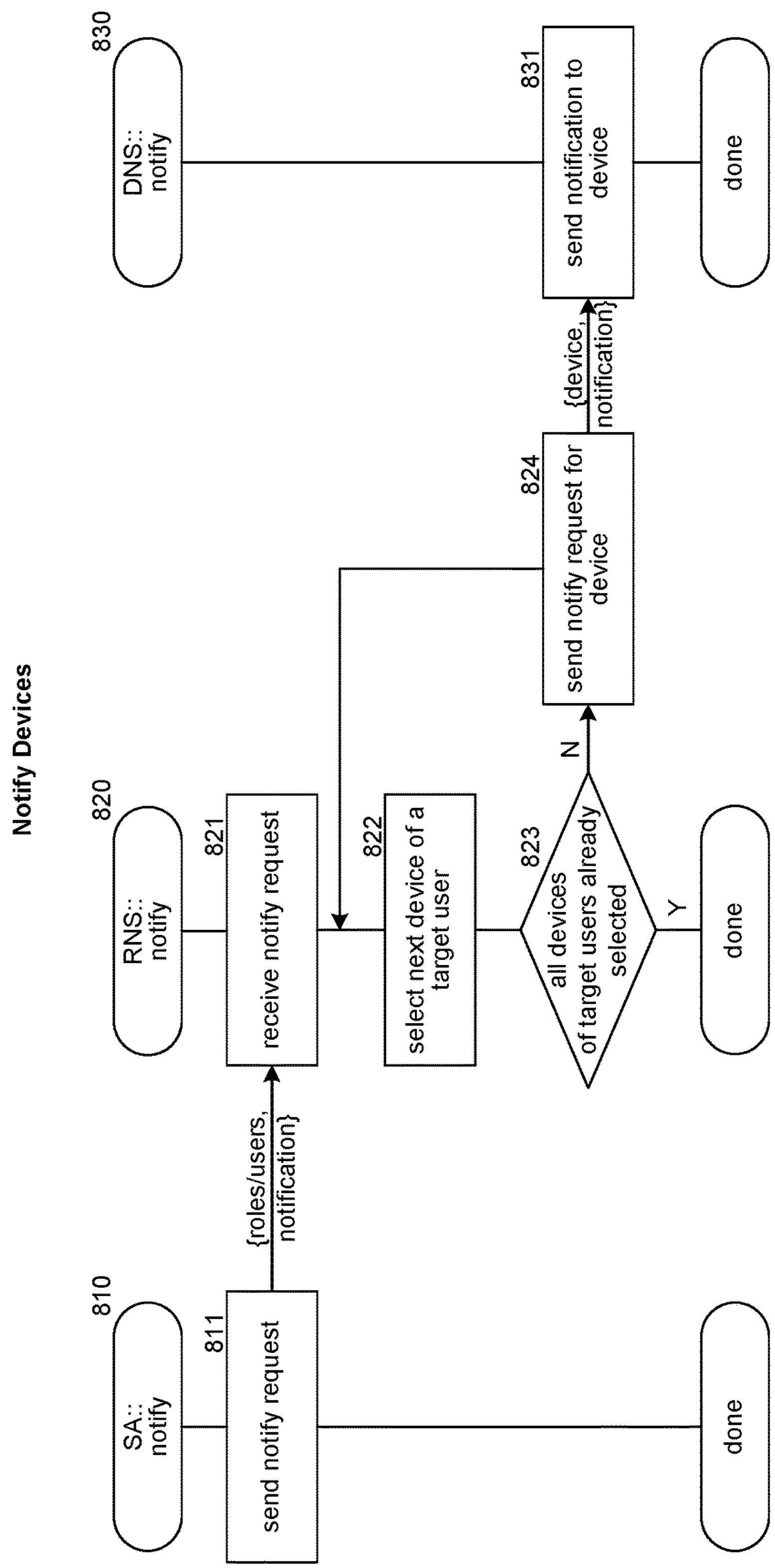
FIG. 8 depicts flow diagrams that illustrate notify components of a server application, an RNS, and a DNS that interact to send notifications to devices.

FIG. 8 depicts flow diagrams that illustrate notify components of a server application, an RNS, and a DNS that interact to send notifications to devices. The flow diagram 810 illustrates processing of a notify component of the server application, the flow diagram 820 illustrates the processing of a notify component of the RNS, and the flow diagram 830 illustrates the processing of a notify component of the DNS. In block 811, the server application sends a notification request to the RNS. The notification request may identify one or more roles or may identify a set of individual users or some combination of both. In block 821, the RNS receives the notification request. In blocks 822-824, the RNS loops, selecting the next device of a target user specified by the request and sending a notification request to the devices of that user. A target user is a user individual specified in the request or a user of a target role specified in the request. In some embodiments, the RNS checks to ensure that the notification is sent only once to each device. For example, if a user is part of two different sub-roles of a role, the RNS will not send two notifications to each device of that user. In block 824, the RNS sends the notification to the DNS. In block 831, the DNS sends the notification request to the identified device.

The following list contains the APIs provided to server applications and client applications by the RNS. The API is provided as HTTP methods:

1) Register User
  a. Manage the registration of users by a server application. An application key and a private application key is passed along with the information described below to securely identify the server application.
  b. Post: Add a new user; user information is passed and user key is returned
  c. Put: Update user information; user information and user key are passed
  d. Get: Retrieve user information; user key is passed and user information is returned
  e. Delete: Delete a user; user key is passed 2) Register Role
  a. Manage the registration of roles by a server application. An application key and a private application key is passed along with the information described below to securely identify the server application.
  b. Post: Add a role user; role information is passed and role key is returned
  c. Put: Update role information; role information and role key are passed
  d. Get: Retrieve role information; role key is passed and role information is returned
  e. Delete: Delete a role; role key is passed 3) Register Role Mapping
  a. Manage the registration of role mappings of users and sub-roles to roles by a server application. An application key and a private application key is passed along with the information described below to securely identify the server application.
  b. Post: Add a mapping of user to role; role mapping information, role key, and user key are passed and role mapping key is returned
  c. Put: Update a mapping; role mapping information and role mapping key are passed
  d. Get: Retrieve role mapping information; role mapping key is passed and role mapping information is returned
  e. Delete: Delete a mapping; role mapping key is passed 4) Retrieve User Security Key
  a. Request a time-sensitive user security key for a user device registration. An application key and a private application key is passed along with the information described below to securely identify the server application.
  b. Get: Retrieve user security key; user key is passed and user security key and validity period (e.g., 15 minutes) is returned.

5) Send Notification
  a. Send a notification to the target users or roles or both. Once the RNS receives the request, it identifies registered user devices to which the notification will be sent. For each identified registered user device, the RNS may make a request to the DNS to push the notification to the device. The RNS stores the identification of the user devices to which the push notification was sent. An application key and a private application key is passed along with the information described below to securely identify the server application.
  b. Post: Send notification; a notification context object is passed
  c. The notification context object contains the details of the notification to be sent and the target users or roles or both. The notification context object may contain the following:
    i. Id (unique identifier)
    ii. Message
    iii. Priority
    iv. Users (can be empty)
    v. Roles (can be empty)
    vi. Note: The user key and role key both cannot be empty.

6) Register User Device
  a. Register a user device to a user. The RNS validates the object provided based on the time-sensitive user security key provided by the server application.
  b. Post: Register user device; device information, user key, and user security key are passed The RNS may provide a management portal via HTTP methods to allow server applications to perform administrative operations such as resetting user device mappings, configuring application keys, and reporting (e.g., notifications sent, system status, and logging information). The management portal may provide an API via an endpoint that is different from the endpoint of the API for registering role mappings and sending the notifications to isolate the security of users who can access the administrative operations. For each of the following operations, an application key and a private application key are passed along with the information described below to securely identify the server application.

The following list contains the APIs provided by the management portal:

1) De-register User Devices
  a. Delete mapping of a user to devices
  b. Delete: Delete a mapping; user key is passed 2) Manage Application Key
  a. Manage the application key that publicly identifies the server application with the RNS.
  b. Put: Update application information such as description and status; application information is passed
  c. Get: Retrieve application information; application information is returned
  d. Delete: Remove server application from RNS 3) Status a. Retrieve status of the server application b. Get: Retrieve status; object containing status of server application is returned 4) Report a. Provide a report of the application b. Get: Retrieve report; a date range is passed and the report is returned c. The report object contains information about the application such as notifications sent, broken down by user/role/devices, any errors that occurred, etc.

The following list contains the APIs provided by the server applications via HTTP methods for use by client applications:

1) Retrieve Context Information for Device Registration a. Retrieve content information to register the user device with the RNS b. Get: Retrieve context information; a user identifier is passed and the context information is returned c. A context information includes an identifier of the RNS endpoint, the application key, and the user security key Embodiment 1

A method performed by a computing system is provided for a role-based notification service to send role-based notifications to devices of users via a device-based notification service. After receiving from an application requests to register mappings of users to roles, the method stores the mappings of users to roles. After receiving from devices of users requests to register the devices to users, the method stores registrations of devices to users. The method also after storing the mappings and the registrations, receives from the application a request to send a notification to users with a target role; identifies devices of users with the target role based on the mappings of users to the target role and the registrations of users with the target role to the devices; and requests the device-based notification service to send the notification to the identified devices.

Embodiment 2

The method of embodiment 1 wherein, after receiving from the application a request to register a mapping of a user to a role, the method provides to the application a user security key, wherein a request to register a device to that user includes the user security key to authenticate that user.

Embodiment 3

The method of embodiment 1 or 2 wherein the request to register mappings of users to roles includes a private application key to authenticate the application.

Embodiment 4

The method of embodiment 1, 2, or 3 wherein the device-based notification service interfaces with various platform-specific notification services to send notifications to devices supporting various platforms.

Embodiment 5

The method of embodiment 1, 2, 3, or 4 wherein the role-based notification service and the device-based notification service execute on servers of a data center.

Embodiment 6

The method of embodiment 1, 2, 3, 4, or 5 wherein applications of a subscriber of the role-based notification service are grouped into a subscriber publishing group so that the applications can share mappings of users to roles.

Embodiment 7

A method performed by a computing system is provided for an application to support the registering of devices to users of a role-based notification service. The method provides to a device of a user context information for use in registering the user with the application to enable role-based notifications to be sent to the user. The method receives from the device a request to register the user based on the context information. The method also after receiving the request, requests from the role-based notification service a user security key for the user; receives from the role-based notification service the user security key for the user; and sends to the device of the user the user security key for registering with the role-based notification service.

Embodiment 8

The method of embodiment 7 wherein the providing to the device the user context information includes sending to the user an electronic message that includes the context information.

Embodiment 9

The method of embodiment 7 or 8 wherein the electronic message is a mail message.

Embodiment 10

The method of embodiment 7, 8, or 9 wherein the electronic message includes a link to launch on the device a client application to register the user.

Embodiment 11

The method of embodiment 7, 8, 9, or 10 wherein the sending to the device of the user the user security key also sends identifications of the role-based notification service and the application.

Embodiment 12

The method of embodiment 7, 8, 9, 10 or 11 wherein the application is a server application.

Embodiment 13

The method of embodiment 7, 8, 9, 10, 11, or 12 including registering with the role-based notification service mappings of users to roles.

Embodiment 14

The method of embodiment 7, 8, 9, 10, 11, 12, or 13 including sending a request to the role-based notification service to send a notification via the device-based notification service to devices of users with a target role.

Embodiment 15

A method performed by a computing system is provided for an application to send role-based notifications to users.

The method registers with a notification system mappings of users to roles. The method provides to a device of a user a user security key for registering with the notification system the device to the user. The method generates a notification to send to users with a target role. The method also sends to the notification system a request to send the generated notification to devices registered to users with the target role.

Embodiment 16

The method of embodiment 15 further wherein a mapping of users to roles includes a mapping of a role as a sub-role as another role.

Embodiment 17

The method of embodiment 15 or 16 wherein the request to send the generated notification includes a private application key for authenticating the application to the notification system.

Embodiment 18

The method of embodiment 15, 16, or 17 wherein applications of a subscriber are grouped into a subscriber publication group wherein an application key is shared by the applications in the subscriber publication group and each application has a private application key.

Embodiment 19

The method of embodiment 15, 16, 17, or 18 including sending another request to the notification system to send a notification to devices of users with another target role wherein the mapping of users to the other target role was registered by another application of the subscriber publishing group.

Embodiment 20

The method of embodiment 15, 16, 17, 18, or 19 wherein the second request includes the private application key of the other application.

Embodiment 21

A method performed by a device of a user is provided for registering to receive role-based notifications. The method receives from an application context information for registering the user of the device to receive role-based notifications. The method uses the context information to send to the application authentication information to authenticate the user and a request to register the user to receive role-based notifications. The method receives from the application a user security key and an identifier of a notification system. The method sends to the notification system a request to register the device to the user along with the user security key wherein the notification system registers the device to the user and the application registers with the notification system a mapping of the user to a role.

Embodiment 22

The method of embodiment 21 wherein the notification system sends a notification to a device based on the mapping of the user to a role and the registration of the device to the user.

Embodiment 23

The method of embodiment 21 or 22 wherein the notification system integrates role-based notification functionality and device-based notification functionality.

Embodiment 24

The method of embodiment 21, 22, or 23 wherein the notification system is a role-based notification service that uses a separate device-based notification service to send notifications to devices.

Embodiment 25

The method of embodiment 21, 22, 23, or 24 further comprising sending to the device-based notification service a request to register the device with the device-based notification service.

Embodiment 26

A method performed by a computing system is provided for a role-based notification service to send role-based notifications to users. The method receives from an application requests to register mappings of users to roles. The method receives from devices of users requests to register the devices to users. The method after registering the mappings and the devices, receives from the application a request to send a notification to users with a target role. The method identifies devices of users with the target role based on the mapping of users to the target role and devices registered to the users with the target role. The method then sends the notification to the identified devices.

Embodiment 27

The method of embodiment 26 wherein the sending of the notification includes requesting a device-based notification service to send the notification to the identified devices and wherein the identified devices are registered with the device-based notification service.

Embodiment 28

The method of embodiment 26 or 27 wherein the sending of the notification sends the notification to the identified devices without using a device-based notification service.

Computer-executable instructions that implement the methods of embodiments 1-28 may be stored on a computer-readable storage medium. The computer-readable storage medium that stores the instructions may also be part of a computing system with a processor for executing the instructions.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computer role-based notification system, the method comprising:

grouping a plurality of applications of a subscriber of a role-based notification service into a subscriber publishing group;

providing the subscriber publishing group with a private application key, the plurality of applications within the subscriber publishing group being configured to share the private application key;

receiving from an application of the plurality of applications within the subscriber publishing group a request to register mappings of users of the application to roles, the request including an indication of the roles and the users within each role, including information identifying the application, and including the private application key;

authenticating the application based on the private application key;

after receiving the request to register the mappings of the users to the roles and authenticating the application, storing the mappings of the users to the roles as indicated by the request in association with the application as indicated by the information identifying the application and in association with the subscriber publishing group, the plurality of applications within the subscriber publishing group being configured to share the stored mappings of the users to the roles based on the private application key;

receiving from devices of the users of the application requests to register the devices to the users of the application;

after receiving the requests to register the devices to the users of the application, storing registrations of the devices to the users of the application in association with the application; and after storing the mappings of the users of the application to the roles and the registrations of the devices to the users of the application, receiving from the application a request to send a notification to at least one user of the application having a target role, the request including information identifying the application;

identifying the at least one user of the application having the target role based on the mappings of the users to the roles and based on the target role;

identifying at least one device of the identified at least one user based on the registrations of the devices to the users of the application and the identified at least one user; and requesting a device-based notification service to send the notification to the identified at least one device.

2. The method of claim 1 further comprising, after receiving from the application of the plurality of applications within the subscriber publishing group the request to register the mappings of the users to the roles, providing to the application a user security key, a request to register a device to that user includes the user security key to authenticate that user.

3. The method of claim 1, the device-based notification service being configured to interface with a plurality of platform-specific notification services to send notifications to devices supporting a plurality of platforms.

4. The method of claim 1, the computer role-based notification system being a server of a data center.

5. A computing system comprising:

a computer-readable storage medium storing computer-executable instructions adapted to control the computing system to group a plurality of applications of a subscriber of a role-based notification service into a subscriber publishing group;

provide the subscriber publishing group with a private application key, the plurality of applications within the subscriber publishing group being configured to share the private application key;

receiving from an application of the plurality of applications within the subscriber publishing group a request to register mappings of users of the application to roles, the request including an indication of the roles and the users within each role, including information identifying the application, and including the private application key, store the mappings of the users to the roles, the plurality of applications within the subscriber publishing group being configured to share the stored mappings of the users to the roles based on the private application key;

provide to a device of a user context information for use in registering the user with an application of the plurality of applications to enable role-based notifications to be sent to the user;

receive from the device a request to register the user based on the context information; and after receiving the request, request from a role-based notification service a user security key for the user;

receive from the role-based notification service the user security key for the user; and send to the device of the user the user security key for registering with the role-based notification service; and a processor for executing the computer-executable instructions stored in the computer-readable storage medium.

6. The computing system of claim 5, the computer-executable instructions that provide to the device the user context information being further adapted to send to the user an electronic message that includes the context information.

7. The computing system of claim 6, the electronic message being a mail message.

8. The computing system of claim 6, the electronic message including a link to launch on the device to register the user.

9. The computing system of claim 5, the computer-executable instructions that send to the device of the user the user security key being further adapted to send identifications of the role-based notification service and the application.

10. The computing system of claim 5, the application being a server application.

11. The computing system of claim 5, the computer-executable instructions further including instructions to send a request to the role-based notification service to send a notification via a device-based notification service to devices of users with a target role.

12. A method performed by a computing system for a role-based notification service, the method comprising:

grouping a plurality of applications of a subscriber of the role-based notification service into a subscriber publishing group;

providing the subscriber publishing group with a private application key, the plurality of applications within the subscriber publishing group being configured to share the private application key;

receiving from an application of the plurality of applications within the subscriber publishing group a request to register mappings of users of the application to roles, the request including an indication of the roles and the users within each role, including information identifying the application, and including the private application key;

storing with a notification system the mapping of the users of the application to the roles, the plurality of applications within the subscriber publishing group being configured to share the stored mappings of the users to the roles based on authenticating the private application key;

providing to a device of one of the users user a user security key for registering with the notification system the device to the user;

generating a notification to send to users with the a target role; and sending the generated notification to the at least one registered device of the user with the target role.

13. The method of claim 12, the mapping of the users to the roles including a mapping of one of the roles as a sub-role of another role.

14. The method of claim 12 including sending another notification to devices of users with another role whose mapping was registered by another application of the subscriber publishing group.

* * * * *